United States Patent
Meincke

(10) Patent No.: US 9,708,806 B2
(45) Date of Patent: Jul. 18, 2017

(54) DRAINAGE BODY SURFACE UNIT

(71) Applicant: ACO SEVERIN AHLMANN GMBH & CO. KG, Budesldorf (DE)

(72) Inventor: Arne Meincke, Osdorf (DE)

(73) Assignee: ACO Severin Ahlmann GmbH & Co. KG, Budelsdorf (DE)

(*) Notice: Subject to any disclaimer, the term of this patent is extended or adjusted under 35 U.S.C. 154(b) by 0 days.

(21) Appl. No.: 14/373,727

(22) PCT Filed: Jan. 23, 2013

(86) PCT No.: PCT/EP2013/051198
§ 371 (c)(1),
(2) Date: Jul. 22, 2014

(87) PCT Pub. No.: WO2013/110635
PCT Pub. Date: Aug. 1, 2013

(65) Prior Publication Data
US 2014/0369757 A1    Dec. 18, 2014

(30) Foreign Application Priority Data

Jan. 24, 2012   (DE) .................. 10 2012 100 552

(51) Int. Cl.
*E03F 1/00*    (2006.01)

(52) U.S. Cl.
CPC .............. *E03F 1/00* (2013.01); *E03F 1/005* (2013.01)

(58) Field of Classification Search
CPC combination set(s) only.
See application file for complete search history.

(56) References Cited

U.S. PATENT DOCUMENTS

| | | | |
|---|---|---|---|
| 3,789,615 A * | 2/1974 | Maroschak | E02B 11/005 138/121 |
| 7,473,053 B1 * | 1/2009 | Brochu et al. | 405/49 |
| 2012/0255624 A1 * | 10/2012 | Canney et al. | 137/315.01 |

FOREIGN PATENT DOCUMENTS

| | | |
|---|---|---|
| AU | 454536 | 10/1974 |
| CN | 2863952 Y | 1/2007 |
| CN | 201292616 Y | 8/2009 |
| CN | 201649312 U | 11/2010 |
| GB | 2 258 792 | 2/1993 |
| WO | WO 2011/042415 | 4/2011 |

OTHER PUBLICATIONS

Germany Office Action from German Application No. DE 10 2012 100 552.4, dated Sep. 4, 2012.
(Continued)

*Primary Examiner* — Kyle Armstrong
(74) *Attorney, Agent, or Firm* — Westman, Champlin & Koehler, P.A.

(57) ABSTRACT

Drainage body surface units are known with conical spacer elements which are connected together via a base. The spacer elements have casing surfaces which run undulating in cross-section, comprising successive wave peaks and wave troughs. In order to guarantee as high a strength as possible with as little material usage as possible, a construction is proposed in which the wave peaks transform into the wave troughs via transitional regions, wherein the transitional regions have a smaller material thickness than the wave troughs.

8 Claims, 1 Drawing Sheet

(56) References Cited

OTHER PUBLICATIONS

International Search Report and Written Opinion from PCT/EP2013/051198, dated Apr. 5, 2013.
English translation of Written Opinion for PCT Application No. PCT/EP2013/051198, dated Jul. 29, 2014, 6 pages.
First Office Action for Chinese Patent Application No. 201380006352.1, dated May 4, 2015, 5 pages.

* cited by examiner

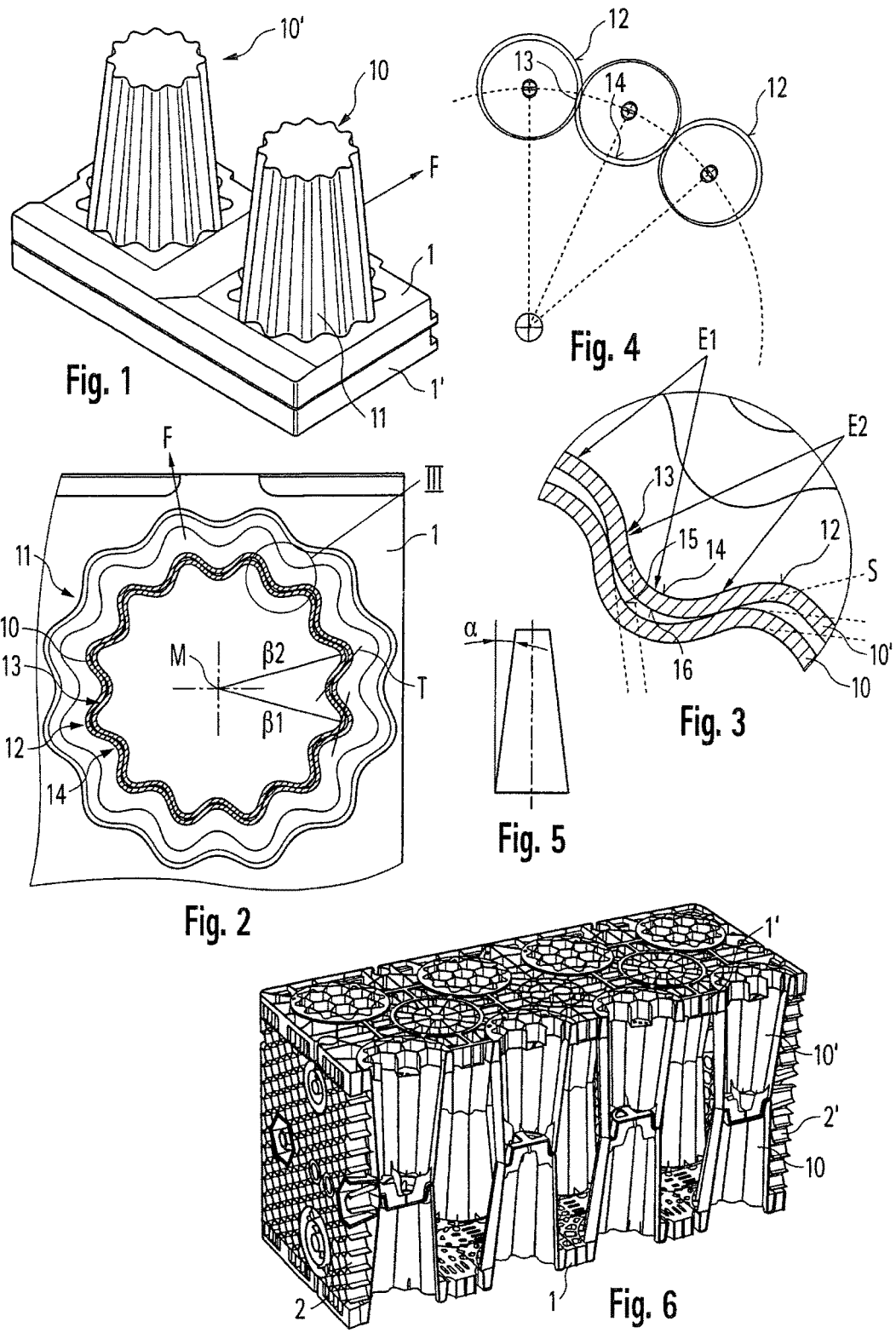

DRAINAGE BODY SURFACE UNIT

CROSS-REFERENCE TO RELATED APPLICATION

This Application is a Section 371 National Stage Application of International Application No. PCT/EP2013/051198, filed Jan. 23, 2013 and published as WO 2013/110635 on Aug. 1, 2013, not in English, the contents of which are hereby incorporated by reference in their entirety.

The invention concerns a drainage body surface unit according to the preamble of claim 1.

WO 2011/042415 A1 discloses a trench drain, the drainage body of which is composed of two drainage body surface units as shown in FIG. 6. Such drainage bodies are buried in the ground and serve to receive water which is then dissipated into the ground. Such drainage bodies must therefore be able to absorb relatively high loads, since vehicles drive over the ground below which the drainage bodies are installed. Primarily these loads are vertical loads, but loads also occur which act laterally on the drainage body.

The known drainage body surface units have bases 1, 1' from which spacer elements 10, 10' protrude. These have tapering casing surfaces which, in the embodiment shown in WO 2011/042415 A1, are fitted with beads for reinforcement or stabilisation.

Such trench drains should firstly require as little material usage as possible, which not only reduces costs but also facilitates transport and construction. Secondly, the completed, installed trench drains should have as high a stability as possible.

The invention is based on the object of refining a drainage body surface unit of the type cited initially to achieve an improved stackability and as high a stability as possible with minimum material usage.

This object is achieved by the drainage body surface unit explained in claim 1.

In particular this object is achieved with a drainage body surface unit with conical spacer elements which are connected via a base and stand at an angle $\alpha$ to the vertical, and in cross section have undulating casing surfaces comprising successive wave peaks and troughs, in that the wave peaks transform into the wave trough via transitional regions, wherein the transitional regions have a smaller material thickness than the wave troughs.

This construction guarantees that firstly as a high stability is possible is guaranteed with low material usage, since the transitional regions contribute relatively little to stability against vertical forces. Secondly the stackability i.e. the volume assumed by several drainage body surface units stacked on each other for storage or transport, is improved.

The transitional regions preferably connect the wave peaks to the wave troughs via constant surfaces which are free from kinks and jumps. This gives maximum stability and also entails advantages for injection moulding.

The wave peaks preferably have a smaller material thickness than the wave troughs. Surprisingly it has been shown that if the wave troughs have a greater material thickness than the wave peaks, both make similarly high contributions to the bending stability of the spacer elements. The bending stability means the stability against the force which presses the casing surface outward under the effect of a vertical force on the spacer elements.

The wave peaks and the wave troughs are preferably formed as tubular portions with arcuate contour in the circumferential direction. This shape firstly gives a particularly high bending stiffness and secondly the design and calculation are still simple.

The spacer elements are preferably dimensioned such that when the drainage body surface units are stacked, a gap remains between the outer faces of the spacer elements of a lower drainage body surface unit and the inner faces of the spacer elements of an upper drainage body surface unit. This guarantees that the conical spacer elements do not seize on stacking. It should be pointed out here that the phrase "a gap remains" does not mean that the outer faces and inner faces of the spacer elements may never touch under any circumstances. Rather it means that contact points (or lines) indeed exist between these surfaces but the surfaces are not in complete contact with each other.

Preferably the angle $\alpha$ which determines the conicity of the spacer elements is 8° to 12°, preferably around 10°. This relatively acute angle has proved advantageous firstly with regard to the resulting bending strength, i.e. the resistance to vertical loads, and secondly spacer elements with such a form or the drainage body surface units constructed therefrom can still be stacked together and hence transported and stored easily.

The spacer elements preferably have a height of 500 to 700 mm, preferably 550 to 650 mm, in particular however 600 to 610 mm. With such dimensioning, a sufficient strength is guaranteed with acceptable material usage.

The ratio of the material thickness of the transitional regions to the material thickness of the wave peaks is 0.3 to 0.9, preferably 0.34 to 0.82.

The invention is now explained below in more detail with reference to the enclosed drawings. The drawings show:

FIG. 1 a perspective view of a portion of one drainage body surface unit of two drainage body surface units stacked together, FIG. 2 a diagrammatic horizontal section through one of the spacer elements according to FIG. 1, FIG. 3 an enlarged depiction of region III from FIG. 2, FIG. 4 an explanation of the basic structure of the casing surface, FIG. 5 a highly diagrammatic depiction of a spacer element in side view, and FIG. 6 a partly cutaway perspective depiction of a known drainage body.

In the description which follows, the same reference numerals are used for the same parts and those with the same effect.

As evident from FIGS. 1 to 3, the drainage body surface units comprise a base 1 from which spacer elements 10, 10' protrude. These spacer elements 10, 10' have a casing surface 11 which—as shown in particular from FIGS. 2 and 3—curves in undulating form with alternating wave peaks 12 and wave troughs 14. The wave peaks 12 are the portions which protrude outward from the spacer elements 10, 10' and the wave troughs 14 are the portions which protrude into the spacer elements 10, 10'.

The wave peaks 12 are connected to the wave troughs 14 via transitional regions 13.

The conicity is defined according to FIG. 5 via an angle $\alpha$ to the vertical which, in the exemplary embodiments shown here, is 10°.

In the exemplary embodiment shown here, the wave peaks 12 and wave troughs 14 are formed via "tubular portions" with tangential transitions which are arranged evenly around the circumference of a circle. This is shown diagrammatically in FIG. 4. In contrast to the known arrangement according to FIG. 6 therefore, no reinforcing ribs are provided on the inner and outer faces but the cone faces are formed correspondingly. Under vertical load, the casing surfaces 11 of the spacer elements 10, 10' are loaded with a force F to bend outward (see FIGS. 1 and 2). It is advantageous here if the extremes, i.e. the wave peaks 12 and the wave troughs 14, are formed with a relatively large cross-section in relation to a centre axis M of the conical form. In other words, the greater the angle $\beta_1$ of the tangent T of the arc to the cone centre axis M, the more cross-section area E1 is made available.

In the transitional regions 13 with cross-section area E2, the tangent $\beta_2$ points more in the direction toward the centre axis M and therefore, because of said force conditions (bending), need transfer substantially only thrust loads. This transitional region 13 is formed with a smaller cross-section i.e. thinner than the regions of the wave peaks 12 and the wave troughs 14. These transitional regions are shown again diagrammatically in FIG. 4 so that in each case, circles of different sizes, mutually offset with their centres, alternately form the wave troughs 14 and wave peaks 12 which are connected together via transitional regions 13 of smaller cross-section.

Furthermore the figures, in particular FIG. 3, show that when the spacer elements 10, 10' are pushed into each other (for storage and transport), a gap S remains between the inner faces 16 of the "upper" spacer element 10' and the outer faces 15 of the "lower" spacer element 10, which however need only be so large that there is no surface pressure around the entire circumference of the spacer elements 10, 10', so that the spacer elements 10, 10' can be separated again more easily. The extent to which the drainage body surface units can be pushed into each other or stacked on each other is therefore defined by the bases 1 from which the spacer elements 10, 10' protrude (see FIG. 1).

LIST OF REFERENCE NUMERALS 1, 1' Base
10, 10' Spacer element
11 Casing surface
12 Wave peak
13 Transitional region
14 Wave trough
15 Outer face
16 Inner face

The invention claimed is:

1. A drainage body surface unit with conical spacer elements which are connected via a base and stand at an acute angle $\alpha$ to the vertical direction, and which have casing surfaces running undulating in cross section, comprising successive wave peaks protruding outward from the spacer elements and wave troughs protruding into the spacer elements,
wherein
the wave peaks transform into the wave troughs via transitional regions,
wherein
the transitional regions have a smaller material thickness than the wave troughs,
wherein
the spacer elements are dimensioned such that when a plurality of the drainage body surface units are stacked, gaps (S) remain between outer faces of the spacer elements of a lower drainage body surface unit and inner faces of the spacer elements of an upper drainage body surface unit, and wherein the spacer elements are further dimensioned such that the gaps (S) are each aligned with one of the wave troughs.

2. The drainage body surface unit according to claim 1, wherein
the transitional regions connect the wave peaks to the wave troughs in a constant surface, free from kinks and jumps.

3. The drainage body surface unit according to claim 1, wherein
the wave peaks have a smaller material thickness than the wave troughs.

4. The drainage body surface unit according to claim 1, wherein
the wave peaks and the wave troughs are formed as tubular portions with an arcuate contour in the circumferential direction.

5. The drainage body surface unit according to claim 1, wherein
the angle $\alpha$ amounts to 8° to 12°, and preferably 10°.

6. The drainage body surface unit according to claim 1, wherein
the spacer elements have a height from 500 to 700 mm, preferably 550 to 650 mm, and more preferably 600 to 610 mm.

7. The drainage body surface unit according to claim 1, wherein
the ratio of the material thickness of the transitional regions to the material thickness of the wave peaks is 0.3 to 0.9, and preferably 0.34 to 0.82.

8. The drainage body surface unit according to claim 1, wherein
the spacer elements are further dimensioned such that the gaps (S) are circumferentially spaced from each other.

* * * * *